Patented Mar. 17, 1953

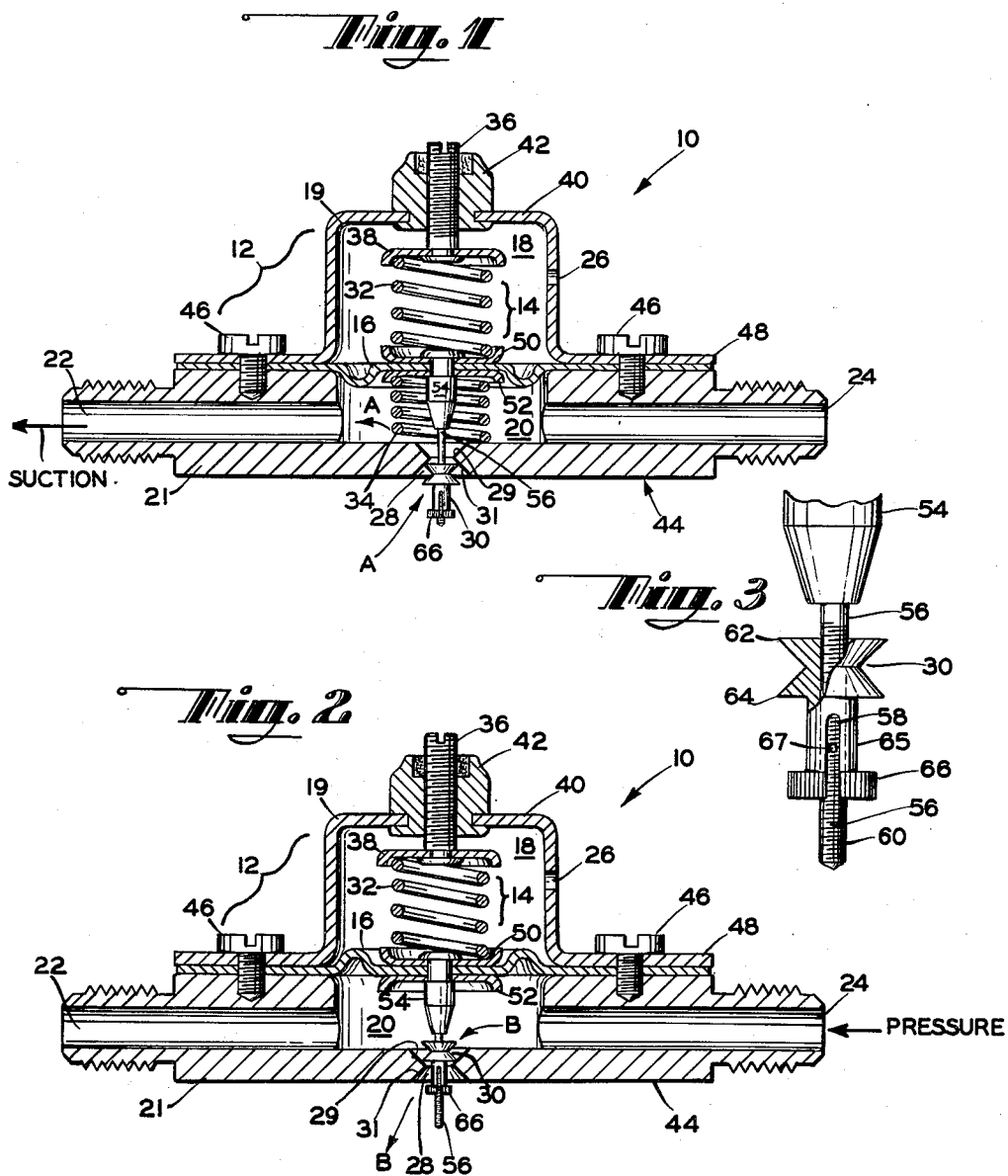

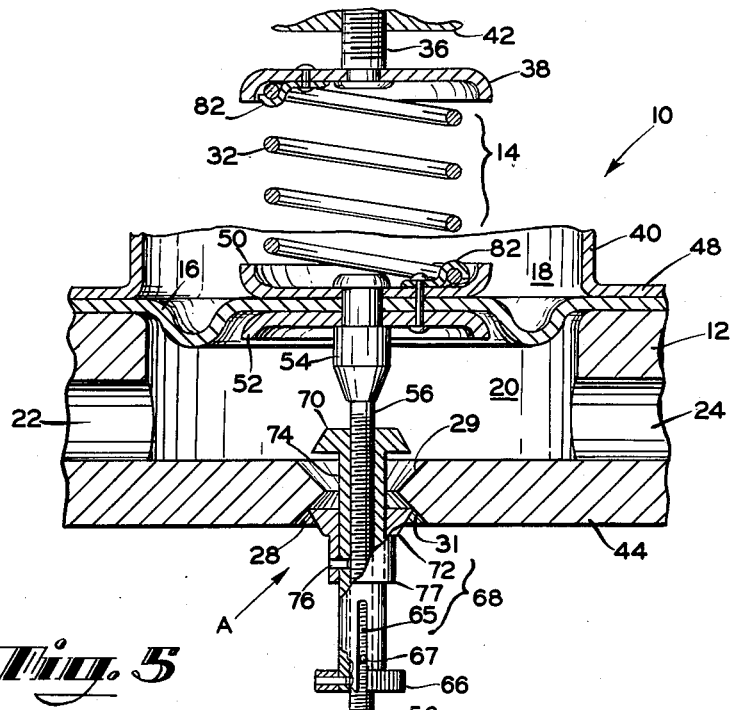
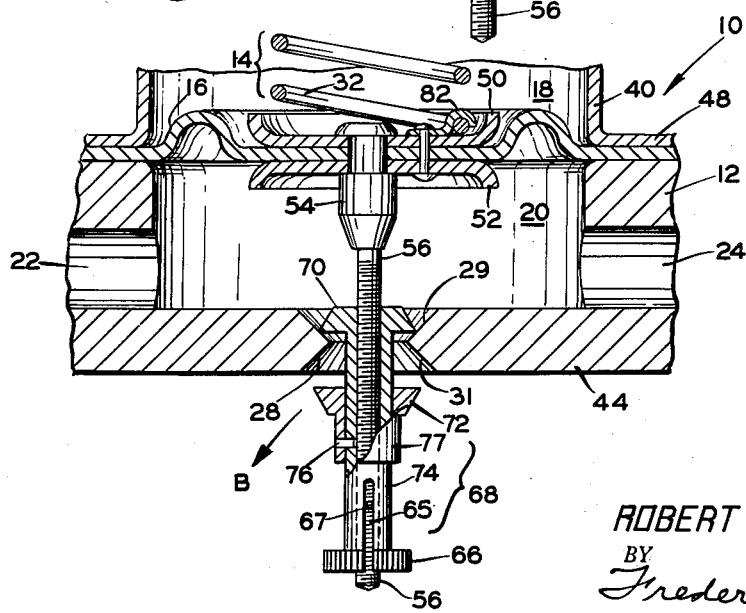

2,631,600

UNITED STATES PATENT OFFICE 2,631,600

DIAPHRAGM OPERATED PRESSURE REGULATING VALVE

Robert M. Flanagan, Glen Rock, N. J., assignor to Bendix Aviation Corporation, Teterboro, N. J., a corporation of Delaware Application November 24, 1947, Serial No. 787,800

4 Claims. (Cl. 137—269)

The present invention relates to regulating valves for maintaining substantially constant pressure or suction of fluid, as for instruments, such as aircraft instruments, irrespective of variations in the speed of the craft, its engine or other means upon which the pressure or suction supply may depend.

Prior devices of the indicated type have had undesirable characteristics such as instability of operation, excessive bulk, weight and cost, undue multiplicity and complication of parts, and other disadvantages.

An object of the present invention is to overcome the above mentioned disadvantages and to do so by novel effective operation and means.

Another object is to provide novel means including fluid-responsive substantially fluid-impervious movable means dividing a valve housing into non-fluid communicating base pressure and regulating compartments, whereby to simplify the valve and render it more effective.

Another object is to provide a valve having the novel feature of a regulating valve member which moves to open the system against the flow of the regulating fluid, which feature improves the stability of operation to a marked degree over a valve having a member which opens the system in the direction of flow of the regulating fluid.

Another object is to provide a single valve which may be readily converted between conditions in which it operates as a pressure regulator or a suction regulator.

Another object is to provide a valve of the above-indicated character which is simple and durable in construction, economical to manufacture, and effective in its operation.

The above and other objects and features of the invention will appear more fully hereinafter from a consideration of the following description taken in connection with the accompanying drawing wherein three embodiments of the invention are illustrated by way of example.

In the drawing:

Figure 1 is a side view generally in section, but having parts in elevation of a suction regulating valve of the invention;

Figure 2 is a similar view of a pressure regulating valve constituting a modification of the invention;

Figure 3 is an enlarged detail section of portions as viewed at the lower center of Figures 1 and 2;

Figure 4 is an enlarged detail, similar to portions as viewed in Figures 1 and 2, of a further modification of the invention, showing parts as adjusted for operation of the device as a suction regulating valve; and Figure 5 shows the parts of Figure 4 adjusted for operation of the device as a pressure regulating valve.

In all of the figures, corresponding parts are designated by corresponding reference characters.

The term "pressure" is employed herein to mean either super-atmospheric pressure on the one hand, or sub-atmospheric pressure, or vacuum, on the other hand, except where the sub and super atmospheric pressures are named as such.

Referring to Figure 1, a regulating valve 10, adapted to maintain a substantially constant fluid pressure differential between two points, has, in combination, a housing 12, means 14 including a fluid-responsive substantially fluid-impervious movable means or, in this instance, a diaphragm 16, dividing the housing 12 into non-fluid-communicating base pressure and regulating compartments 18 and 20, respectively, and adapted to determine the degree of the mentioned differential.

The housing 12 has ports 22 and 24 adapting the regulating compartment 20 for communication between the aforesaid points, duct means 26 adapted to provide communication of the base pressure compartment 18 with a source of base fluid pressure, which in this case is the atmosphere, and a valve orifice 28 between the interior and exterior of the regulating compartment 20 through which fluid is adapted to flow, in the direction of arrows A, in regulating the aforesaid differential. The orifice 28 is surrounded, in the position shown, by oppositely-facing upper and lower conical valve seats 29 and 31, respectively.

A valve element 30, for opening and closing the orifice 28, is operative by the movable means 16, and movable, in opening the orifice 28, away from the lower seat 31 against the flow, represented by the arrows A, in opening the orifice 28.

The means 14 is adapted to determine the degree of differential between the ports 22 and 24 by the inclusion of springs 32 and 34 in the compartments 18 and 20, respectively, by the adjustment of a screw 36, carrying a seat 38 for the spring 32, and extending through a housing portion 40 and having a nut 42 mounted on the housing 12 in axially stationary rotative relation to, and operable from the exterior of, the housing.

The housing 12 further comprises a plate or disc-like base 44 having the compartment 20, the ports 22 and 24, and the orifice 28, on which the diaphragm 16 is held, as by studs 46, and a flange 48 of the housing portion 40.

Elements 50 and 52 constituted as seats for the springs 32 and 34, respectively, and as broad-area means for clamping against opposite sides of the diaphragm 16 are secured to the diaphragm, as by a rivet-like member 54, to which the valve element 30 may be connected, as by a stem 56.

In operation, when suction is applied at the point 22, the pressure in the regulating compartment 20 is reduced below the pressure in the base-pressure compartment 18, which causes the diaphragm 16 to flex downwardly, as viewed in the drawing. This action moves the valve member 30 downwardly, or in direction counter to the direction of flow, indicated by the arrows A, of the regulating fluid, or atmospheric air in this illustration, bleeding into the main stream.

By adjusting the nut 42, the force of the spring 32 may be regulated to obtain balance between the spring force and any selected one of a plurality of suction forces at which the valve will operate to maintain the selected suction value substantially constant.

Referring to Figure 2, the construction and operation of the device are substantially identical with those of the device of Figure 1, with the exception that the spring 34 is omitted, the valve element 30 closes downwardly against the upper valve seat 29 and that, when super-atmospheric pressure is applied at point 24, the diaphragm 16 moves upwardly, allowing air to escape at the orifice 28 in the direction of arrows B counter to the direction of movement of the valve element 30.

Referring to Figure 3, the rivet 54, the valve member 30 and the stem 56 are constructed such as to be employable in either the suction valve of Figure 1 or the pressure valve of Figure 2.

The stem 56 is fixed in the rivet 54, and provided with screw threads 60. The valve member 30 has upper and lower seat edges 62 and 64, respectively, a depending sleeve 65 and a handle 66 smaller in diameter than the orifice 28, and constitutes a nut for the stem 56, which nut is held in place, as by a screw or a press-fit or cotter pin 67 extending through one or a pair of slots 58 in the sleeve 65, and through a hole in the stem 56. The latter may be provided with a plurality of axially spaced holes angularly offset from each other about the axis of the stem and each adapted to receive the pin 67.

In the form of Figure 1, in assembly, the stem 56, without the valve and pin 67 thereon, is first placed through the orifice 28, the valve member 30 then mounted and adjusted on the stem, and the pin 67 placed through the slot 58 and through a hole in the stem 56.

In the form of Figure 2, the valve nut 30 is mounted on the stem 56 near the rivet 54 and the handle 66 led through the orifice 28. The pin 67 may be inserted before or after such mounting.

Referring to Figure 4, a valve assembly 68, corresponding to the structure of Figure 3, comprises separate upper and lower valve members 70 and 72, respectively, the upper member 70 of which has a tubular portion 74 threadedly mounted on the stem 56. The lower valve member 72 is fixed to the tubular portion, as by a pin 76, extending through a sleeve portion 77 of the member 72. A cotter pin 67 and a handle 66 are provided as in Figure 3.

In assembling the structure of Figure 4, the stem 56 with the valve member 70 thereon, but not the valve member 72 or the handle 66, is placed through the orifice 28, after which the member 72 is mounted on the tubular portion 74, and fixed by the pin 76. After mounting the handle 66, the assembly 68 is adjusted for proper relation of the valve member 72 to the lower valve seat 31 and locked by the pin 67. As thus conditioned, the device is set up as a suction valve, with the upper valve member 70 out of contact with the upper valve seat 29 at all times.

The device of Figure 4 is shown set up in Figure 5 as a super-atmospheric valve, as by backing off the assembly 68, relative to the stem 56, until the upper valve member 70 is in position to cooperate with the upper valve seat 29, and locking the assembly in position by the pin 67.

Also, in the structure of Figures 4 and 5, the spring 32 is adapted to serve the purposes of both springs 32 and 34 of Figure 1, as by having its ends secured to the spring seats 38 and 50, as by clips 82.

Although only three embodiments of the invention have been illustrated and described, various changes in the form and relative arrangements of the parts may be made to suit requirements.

What is claimed is:

1. In a regulating valve device adapted to maintain a substantially constant fluid pressure differential between two points, the combination of a housing comprising, in one position of the device, an upper portion forming a base pressure compartment including duct means communicating with a source of base fluid pressure, a lower portion forming a regulating compartment including ports providing fluid communication therethrough between said points and having a bottom wall valve orifice surrounded by a valve seat, a flexible diaphragm held between said upper and lower housing portions and dividing said compartments from each other, means for securing said upper and lower housing portions to each other and said diaphragm therebetween, an axially stationary nut rotatively mounted in the top wall of said upper housing portion accessible from the exterior thereof, a screw in said nut carrying an upper seat in the base pressure compartment, diaphragm-clamping elements at the upper and lower sides of the diaphragm, respectively, each constituted as a spring-seating unit, means clamping said elements to the diaphragm, a spring between said upper seat and said upper seating element, a spring between said lower seating element and the bottom of said regulating compartment, a stem carried by said clamping means and extending through said orifice, and a valve closure member on said stem for closing said orifice from below and adapted for downward movement to open the orifice.

2. In a regulating valve device adapted to maintain a substantially constant fluid pressure differential between two points, the combination of a housing comprising, in one position of the device, an upper portion forming a base pressure compartment including duct means communicating with a source of base fluid pressure, a lower portion forming a regulating compartment including ports providing fluid communication therethrough between said points and having a bottom wall valve orifice surrounded by a valve seat, a flexible diaphragm held between said upper and lower housing portions and dividing said compartments from each other, means for securing said upper and lower housing portions to each other and said diaphragm therebetween, an axially stationary nut rotatively mounted in the top wall of said upper housing portion accessible from the exterior thereof, a screw in said nut carrying an upper seat in the base pressure compartment, diaphragm-clamping elements at the upper and lower sides of the diaphragm, respectively, the upper of which constitutes a spring-seating unit, means clamping said elements to the diaphragm, a spring between said upper seat and said upper seating element, a stem carried by said clamping means and extending through said orifice, a valve closure member on said stem for closing said orifice from above and adapted for upward movement to open the orifice, and a handle positioned exteriorly of said housing and cooperating with said stem, said handle independently operable for adjustably positioning said valve closure member on said stem relative to said orifice.

3. In a regulating valve device adapted to maintain a substantially constant fluid pressure differential between two points, the combination of a housing comprising, in one position of the device, an upper portion forming a base pressure compartment including duct means communicating with a source of base fluid pressure, a lower portion forming a regulating compartment including ports providing fluid communication therethrough between said points and having a bottom wall valve orifice surrounded by a valve seat, a flexible diaphragm held between said upper and lower housing portions and dividing said compartments from each other, means for securing said upper and lower housing portions to each other and said diaphragm therebetween, an axially stationary nut rotatively mounted in the top wall of said upper housing portion accessible from the exterior thereof, a screw in said nut carrying an upper seat in the base pressure compartment, diaphragm-clamping elements at the upper and lower sides of the diaphragm, respectively, the upper of which constitutes a spring-seating unit, means clamping said elements to the diaphragm, a spring between and secured to said upper seat and said upper seating element, a stem carried by said clamping means and extending through said orifice, valve closure members adapted for selective cooperation with said orifice from below and above the same and adapted for downward and upward movement, respectively, to open the orifice, and a handle positioned exteriorly of said housing and cooperating with said stem, said handle independently operable for adjustably positioning said valve closure member on said stem relative to said orifice.

4. In a regulating valve device adapted to maintain a substantially constant fluid pressure differential between two points, the combination of a housing comprising, in one position of the device, an upper portion forming a base pressure compartment including duct means communicating with a source of base fluid pressure, a lower portion forming a regulating compartment including ports providing fluid communication therethrough between said points and having a bottom wall valve orifice surrounded by a valve seat, a flexible diaphragm held between said upper and lower housing portions and dividing said compartments from each other, means for securing said upper and lower housing portions to each other and said diaphragm therebetween, an axially stationary nut rotatively mounted in the top wall of said upper housing portion accessible from the exterior thereof, a screw in said nut carrying an upper seat in the base pressure compartment, diaphragm-clamping elements at the upper and lower sides of the diaphragm, respectively, means clamping said elements to the diaphragm, a spring between said upper seat and said upper clamping element, a stem carried by said clamping means and extending through said orifice, a valve closure member on said stem for controlling said orifice, and a handle positioned exteriorly of said housing and cooperating with said stem, said handle independently operable for adjustably positioning said valve closure member on said stem relative to said orifice.

ROBERT M. FLANAGAN.

REFERENCES CITED

The following references are of record in the file of this patent:

UNITED STATES PATENTS

| Number | Name | Date |
|---|---|---|
| 572,580 | Spitizenberg | Dec. 8, 1896 |
| 1,170,050 | Daniels | Feb. 1, 1916 |
| 1,177,204 | Miller | Mar. 28, 1916 |
| 1,266,340 | Stewart | May 14, 1918 |
| 1,290,030 | Acebal | Jan. 7, 1919 |
| 1,470,057 | Carter | Oct. 9, 1923 |
| 1,558,238 | Charter | Oct. 20, 1925 |
| 1,926,373 | Denk | Sept. 12, 1933 |
| 2,074,268 | Lowe | Mar. 16, 1937 |
| 2,075,917 | Vorech | Apr. 6, 1937 |
| 2,217,834 | Corbin | Oct. 15, 1940 |
| 2,311,110 | Johnson | Feb. 16, 1943 |

FOREIGN PATENTS

| Number | Country | Date |
|---|---|---|
| 122,398 | Great Britain | Oct. 29, 1919 |